United States Patent
Fischer

Patent Number: 5,082,074
Date of Patent: Jan. 21, 1992

[54] TRANSPORT VEHICLE

[75] Inventor: Horst Fischer, Oberhausen, Fed. Rep. of Germany

[73] Assignee: Lafis Lagertechnik Fischer GmbH & Co KG, Oberhausen, Fed. Rep. of Germany

[21] Appl. No.: 568,421

[22] Filed: Aug. 16, 1990

Related U.S. Application Data

[63] Continuation-in-part of Ser. No. 376,681, Jul. 7, 1989, abandoned.

[30] Foreign Application Priority Data

Jul. 9, 1988 [DE] Fed. Rep. of Germany ....... 3823377

[51] Int. Cl.⁵ .............................................. B62D 5/04
[52] U.S. Cl. ..................................... 180/11; 180/19.1; 280/33.991
[58] Field of Search ............... 180/11, 19.1, 19.2, 180/19.3, 16, 43.1; 280/33.991, 33.992; 414/340

[56] References Cited

U.S. PATENT DOCUMENTS

| | | | |
|---|---|---|---|
| 3,094,186 | 6/1963 | Lappin et al. | 180/19.1 |
| 3,187,829 | 6/1965 | Nieinski | 180/19.1 |
| 4,266,903 | 5/1981 | Surbrook | 180/19.1 X |
| 4,570,731 | 2/1986 | Oaks | 180/19.3 |

FOREIGN PATENT DOCUMENTS

| | | | |
|---|---|---|---|
| 142836 | 5/1985 | European Pat. Off. | 280/33.991 |
| 203834 | 12/1986 | European Pat. Off. | 280/33.991 |
| 2350308 | 4/1975 | Fed. Rep. of Germany | 280/33.991 |
| 2450692 | 4/1976 | Fed. Rep. of Germany | 280/33.991 |

*Primary Examiner*—Andres Kashnikow
*Assistant Examiner*—Michael Mar
*Attorney, Agent, or Firm*—Herbert L. Lerner; Laurence A. Greenberg

[57] ABSTRACT

A transport vehicle, particularly for shopping carts in trading establishments, includes a base frame having a U shape as seen in a plan view for embracing a shopping cart at a height substantially equal to that of the lower frame of the shopping cart. The base frame has members with free front ends and a transversely oriented rear drive section. Pivotable brackets are each disposed at a respective one of the free front ends. Guide wheels are each guided in a respective one of the pivotable brackets. A driving wheel is centrally and non-pivotably guided in the drive section. The driving wheel has an integrated mobile driving device.

9 Claims, 1 Drawing Sheet

TRANSPORT VEHICLE

This is a Continuation-in-Part application of co-pending application Ser. No. 376,681, filed Jul. 7, 1989 now abandoned.

The invention relates to a transport vehicle, particularly for shopping carts or trolleys in trading establishments.

In retail trading establishments, particularly in large supermarkets, it is customary for the customers to initially place their goods into shopping carts, to pass through the check-out with them and then to repack the goods purchased into transport bags, or pass directly to their parked vehicle with the shopping cart. The collection and return of the shopping carts then requires a considerable outlay, even if a large number of shopping carts can be nested together and returned in a long line, because more than one person is always required to push and guide the shopping carts.

Transport vehicles of that kind are known from German Published, Non-Prosecuted applications (DE-OS) 24 50 692 or 38 23 377. Those transport vehicles include a pivotable drive wheel disposed in the forward, transversely directed drive section, and two rigidly guided wheels at the rear section to provide the vehicle with the necessary stability. Those vehicles can be guided and controlled by a person sitting thereon. It is also possible, however, to utilize a remote control apparatus which is connected to the drive via a cable, whereby the pivotable drive wheel must be additionally equipped with an guide drive to be controlled by electrical signals.

Guiding the transport vehicle from the vehicle itself is possible only with a few nested shopping carts, since a line of shopping cart can no longer be controlled in thrust or push operation. When the vehicle is operated through a control apparatus via the connector cable, additional expenditures become necessary for the additional, separate guide drive. Besides, considerable skill is necessary in push operation to guide the line of shopping carts in the right track.

It is accordingly an object of the invention to provide a transport vehicle, which overcomes the hereinafore-mentioned disadvantages of the heretofore-known devices of this general type which is constructed much more simply and with which shopping carts can be collected and conveyed back to the issuing station, while only one person is required to control the shopping carts and to transport them without exerting physical effort, even for long lines of shopping carts.

With the foregoing and other objects in view there is provided, in accordance with the invention, a transport vehicle, particularly for shopping carts in trading establishments, comprising a base frame having a U shape as seen in a plan view for embracing a shopping cart at a height of the lower frame of the shopping cart, the base frame having members with free front ends and a transversely oriented rear drive section, pivotable brackets each being disposed at a respective one of the free front ends, running wheels each being guided in a respective one of the pivotable brackets, and a driving wheel centrally and non-pivotably guided in the drive section, the driving wheel having integrated mobile drive means.

It is therefore possible for a transport vehicle according to the invention to embrace the last cart in a line of shopping carts, and then to convey the line to the destination by simple steering of the transport vehicle.

In accordance with another feature of the invention, the drive section is box-shaped and has a lateral lower edge, a lateral upper edge and flanges, the driving wheel being attached to the flanges, the members being in the form of two members extending bifurcatedly from the lateral lower edge, and there are provided steering and guiding arms extending from the lateral upper edge for embracing a basket of a shopping cart, the arms having front ends with steering handles and control buttons for the integrated mobile drive means.

In accordance with a further feature of the invention, the drive section is capable of transporting a given maximum number of nested shopping carts in a row, and there is provided a mobile control device with a connecting cable at least as long as the row of the maximum number of nested shopping carts to be transported, and means for hooking the mobile control device onto the drive section. The driver of the row of shopping carts can therefore go to the front shopping cart with the control device, actuate the mobile drive from there and steer the line of shopping carts by hand.

In accordance with an added feature of the invention, there is provided a return cable drum disposed in the drive section, a cable having a rear end wound on the drum and a front end, and a fastening hook disposed on the front end of the cable for hooking into a front shopping cart of a row of shopping carts to be transported, the hook being pluggable onto the drive section. It is therefore not only possible to push a row of shopping carts with the transport vehicle, but also to tow it in the opposite direction, because all of the shopping carts are coupled to the transport vehicle by the cable.

In accordance with an additional feature of the invention, the drive section has an inner surface with an upper region, and there is provided a roller-shaped padded thrust element for the shopping carts being oriented transversely to and flanged to the upper region of the inner surface of the drive section. This feature is advantageous for easier coupling and for avoiding damage to the shopping carts.

In accordance with yet another feature of the invention, there is provided a bracket mast laterally fastened to the drive section, and a signal lamp on top of the mast, the hooking means for the mobile control device being in the form of a bracket strap disposed on the mast. This is done in order to provide optical safety.

In accordance with yet a further feature of the invention, there are provided coupling plates laterally disposed on the drive section for receiving cleaning devices in the form of sweeping rollers or snowplows on the drive side, which creates a further possible use for the transport device.

In accordance with a concomitant feature of the invention, a wireless remote control unit is provided for remotely controlling the transport vehicle, the remote control unit including a remote receiver disposed on the drive section and a remote sender.

With such a construction, namely a non-pivotable driving wheel and steerable or pivotable guide wheels on the free front ends of the frame, it is possible for a single person to manually direct and control the transport vehicle in the right direction at the end of one of the guiding arms or from the front-most shopping cart of the line, whereby the control buttons, the cable-connected control device or the wireless remote control unit switch the rigid drive means to either forward drive, backward drive, or stop.

Other features which are considered as characteristic for the invention are set forth in the appended claims.

Although the invention is illustrated and described herein as embodied in a transport vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
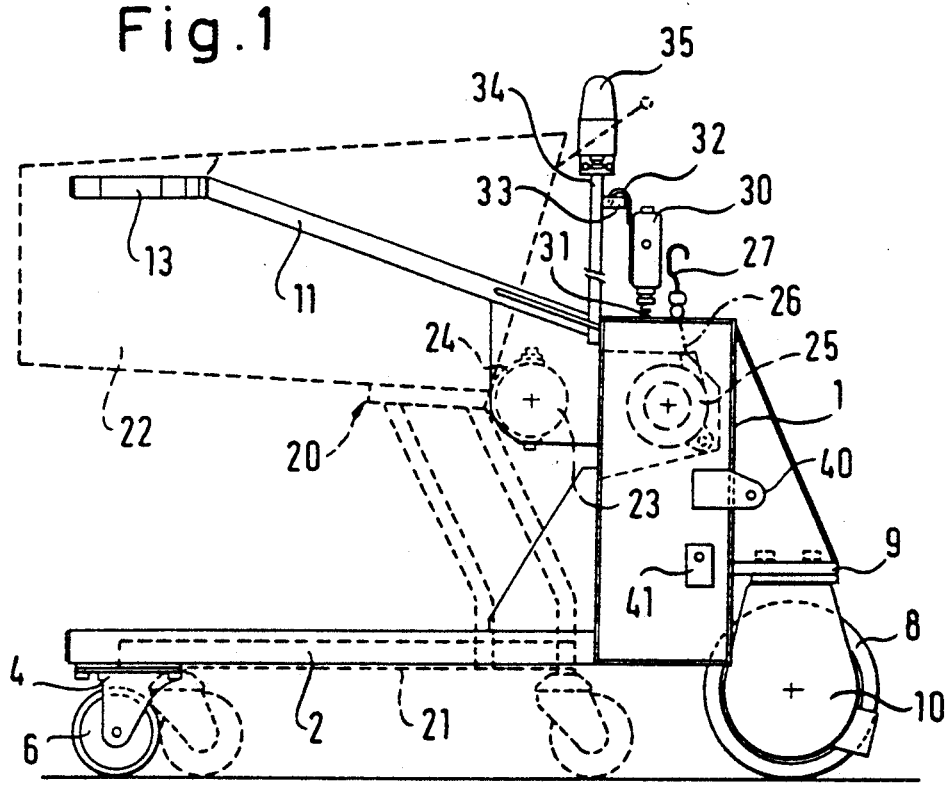
FIG. 1 is a diagrammatic side-elevational view of a transport vehicle.
Figure 2:
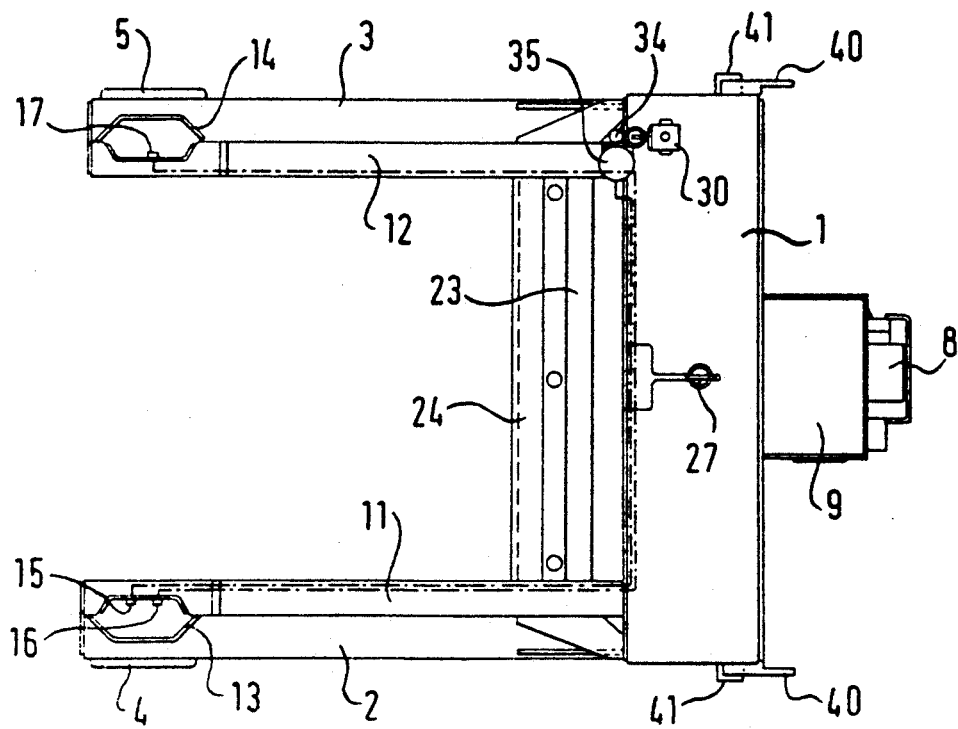
FIG. 2 is a top-plan view of the transport vehicle.

Referring now in detail to the figures of the drawings as a whole, there is seen a transport vehicle having a U-shaped base frame with a transversely oriented box-shaped drive section 1 and two forked or bifurcatedly extending members or legs 2 and 3 attached to the lateral lower edges of the drive section 1. Two pivotable wheels or guide rollers 6 and 7 are guided at the front ends of the members 2 and 3 in respective brackets 4 and 5, which are pivotably mounted on the members 2 and 3. Only the guide wheel 6 is visible in the side elevation of FIG. 1. A driving wheel 8 is non-pivotably mounted facing the rear in a triangular attachment 9 on the drive section 1. The driving wheel 8 has integrated drive means 10 mounted on a wheel shaft.

Two steering and gliding arms 11 and 12, which project obliquely upwards and are attached to upper lateral edges of the drive section 1 by flanges, each have respective steering yokes or handles 13 and 14 and actuating buttons 15, 16 and 17 for the mobile drive means 10 at the front end.

As may be seen from FIG. 1 of the drawing, the lower members 2 and 3 and the two upper steering and guiding arms 11 and 12 embrace or encompass a shopping cart or trolley 20 shown by broken lines, at the height of a lower chassis frame 21 on one hand and at the height of a basket 22 on the other hand.

In order to provide bracing relative to the shopping carts 20, a roller-shaped thrust element 23 is disposed on the thrust side of the drive section 1 at the height of the lower edge of the shopping cart baskets 22. The thrust element 23 has padding or upholstering 24 on the outer surface thereof facing the shopping carts 20, so as to ensure a gentle impact with the shopping carts 20.

When transporting a relatively small number of nested shopping carts 20, the transport vehicle can be gripped laterally and steered by one of the handles 13 and 14 and the drive wheel 8 can be controlled by the control buttons 15 and 16 or 17 to go forward or backward.

In order to make it possible to travel not only in the thrust direction but also in the traction direction, with a group of shopping carts, a self-reeling cable drum 25 is integrated into the drive section 1. A cable 26 which extends out of the cable drum 25 and has a hook 27 at the front end thereof, can be secured on the upper surface of the drive section 1. The hook 27 can be engaged into the front of the shopping carts to be transported with the cable being tensioned by the cable drum 25. Therefore, the shopping carts are then coupled firmly to the transport vehicle, so that the latter can also travel in the traction direction and can tow the shopping carts behind it.

A mobile control device 30 is provided in order to transport of a long row of nested shopping carts having a travel direction which can no longer be controlled from the steering frames 11 or 12 The mobile control device 30 is connected to the drive section 1 by a cable 31 of appropriate length. The driver can then walk forward with the control device 30 to the front end of the line of shopping carts, switch the mobile drive 10 on and off with the control device 30 and then determine the travel direction of the line of shopping carts by hand. It is thus possible for even a large number of nested shopping carts to be transported and conveyed to a destination in simple manner by a single driver without major physical exertion.

When not in use, the control device 30 is advantageously engaged by placing a hook 32 thereof in a bracket 33 which is fastened laterally on a mast 34 on the drive section 1. The mast 34 carries a signal lamp 35 at the upper end thereof which flashes during mobile operation.

The control device 30 may be in the form of a wireless remote control unit. In that case, the cable 31 would not be needed, but instead a remote signal receiver 31 would be mounted on the drive section 1.

In addition, plates 40 and 41 may be laterally attached to the drive section 1. Non-illustrated cleaning devices, in the form of sweeping rollers or snowplows which run on the driving wheel side, may be coupled to the plates 40, 41. The cleaning devices may then likewise be steered and controlled by the steering arms 11 or 12 or the handles 13 or 14 and the corresponding control buttons 15 and 16 or 17.

Thus in general a universally usable transport vehicle is produced, with which on one hand shopping carts can be conveyed, even when collected in a relatively large number, so that transport is possible both in the thrust and in the traction direction, and on the other hand the transport vehicle can be utilized for other purposes, for example as a sweeping roller or snowplow. The rigidly integrated drive is thereby of simple construction, since it is not necessary to provide the drive wheel with guiding capability and since the vehicle is guided simply by guiding the steering frames and thus adjusting the direction of the guide rollers and/or by simply steering the frontmost shopping cart in the desired direction.

I claim:

1. A steerable transport vehicle for wheeled shopping carts with a lower frame to be nested together with similar carts the transport vehicle, comprising a rigid base frame having a U shape as seen in a plan view for embracing the shopping cart, said base frame being disposed at substantially the same height as the lower frame of the shopping cart and having leg members with free rear ends and a transversely oriented front drive section, brackets each being pivotably mounted at a respective one of said free rear ends, guide wheels each being guided in a respective one of said brackets, a non-pivotable driving wheel, means for fixedly mounting said driving wheel to a central portion of said transversely oriented front drive section, said driving wheel having integrated mobile drive means for driving said wheel, and steering and guiding arms extending over said leg members, said arms being adapted to be grasped by a user for steering said transport vehicle.

2. Transport vehicle according to claim 1, wherein said drive section is box-shaped and has a lateral lower edge, a lateral upper edge and flanges, said driving wheel being attached to said flanges, said members being in the form of two members extending bifurcatedly from said lateral lower edge, and said steering and guiding arms extending from said lateral upper edge for embracing a basket of a shopping cart, said arms having ends with steering handles and control buttons for said integrated mobile drive means.

3. Transport vehicle according to claim 1, wherein said drive section is capable of transporting a given maximum number of nested shopping carts in a row, and including a mobile control device with a connecting cable at least as long as said row of said maximum number of nested shopping carts to be transported, and means for hooking said mobile control device onto said drive section.

4. Transport vehicle according to claim 1, including a return cable drum disposed in said drive section, a cable having a rear end wound on said drum and a front end, and a fastening hook disposed on said front end of said cable for hooking into a front shopping cart of a row of shopping carts to be transported, said hook being pluggable onto said drive section.

5. Transport vehicle according to claim 1, wherein said drive section has an inner surface with an upper region, and including a roller-shaped padded thrust element for the shopping carts being oriented transversely to and flanged to said upper region of said inner surface of said drive section.

6. Transport vehicle according to claim 3, including a bracket mast laterally fastened to said drive section, and a signal lamp on top of said mast, said hooking means for said mobile control device being in the form of a bracket strap disposed on said mast.

7. Transport vehicle according to claim 1, including coupling plates laterally disposed on said drive section for receiving cleaning devices in the form of sweeping rollers or snowplows.

8. Transport vehicle according to claim 1, including a wireless remote control unit for remotely controlling the transport vehicle, said control unit including a remote receiver disposed on said drive section and a remote sender.

9. Transport vehicle according to claim 1, including a mobile control device with a connecting cable for remotely controlling the vehicle, and means for hooking said mobile control device onto said drive section.

* * * * *